April 29, 1958  R. M. CRACCHIOLO  2,832,603
BAR STOCK PUSHER
Filed March 29, 1956
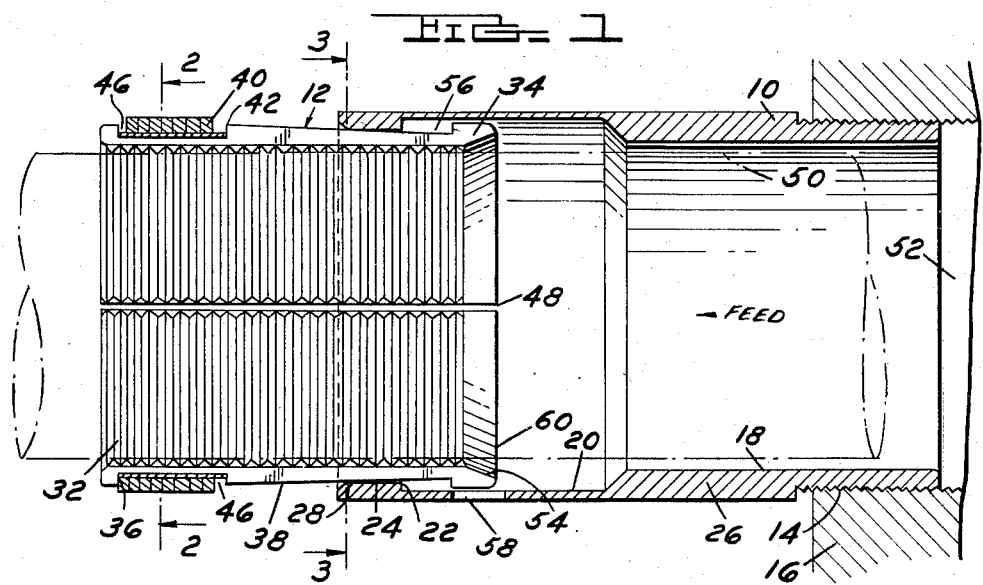
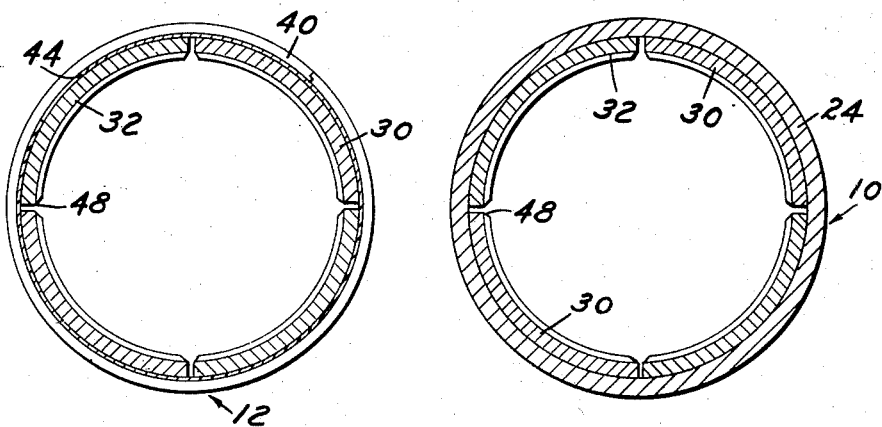
INVENTOR.
RAY M. CRACCHIOLO
BY
ATTORNEYS

United States Patent Office 2,832,603
Patented Apr. 29, 1958

2,832,603
BAR STOCK PUSHER

Ray M. Cracchiolo, Grosse Pointe, Mich., assignor to Burns Automatic Corporation, Roseville, Mich., a corporation of Michigan Application March 29, 1956, Serial No. 574,790

12 Claims. (Cl. 279—58)

This invention relates to a bar stock pusher.

It is an object of this invention to provide a bar stock pusher which is positive in its action; that is, is designed to effectively grip the bar stock and feed it the required distance in an accurate, precise manner and within a minimum time cycle.

A further object of the invention resides in the provision of a bar stock pusher that is designed to effectively grip the bar stock to advance it in the feed direction and nevertheless readily slide over the bar stock without scoring it in the retracting direction.

A further object of the invention resides in the provisions of a bar stock pusher which is economical in construction and nevertheless very durable.

In the drawing:

Fig. 1 is a longitudinal sectional view of a bar stock pusher constructed in accordance with the present invention.

Fig. 2 is a sectional view taken along the lines 2—2 in Fig. 1.

Fig. 3 is a sectional view taken along the lines 3—3 in Fig. 1.

The bar stock pusher of the present invention generally comprises two main components, a shell 10 and a pad assembly 12. The pusher shell 10 is externally threaded at one end as at 14 for engagement with the conventional power-driven pusher actuator 16 on the machine on which the pusher is mounted. Pusher actuator 16 is automatically shifted through a feed stroke and then retracted at the end of each machining cycle to present the required length of bar stock from which the work piece is formed. Shell 10 is fashioned with a through bore 18 enlarged as at 20 and terminating adjacent one end of the shell in an annular shoulder 22 projecting radially inwardly of the shell. The portion 24 of the side wall 26 of the shell on which shoulder 22 is formed is fashioned with a rounded internally tapered nose portion 28 which extends to the end face of the pusher shell. Nose portion 28 is preferably ground to a rather large radius.

The pad assembly 12 comprises four arcuate pads 30, each of which is of identical configuration. Each pad 30 generally forms a 90° segment of a circle. The inner surfaces of these pads are generally cylindrical and preferably provided with serrations 32. At their outer surfaces, the pads are provided with an annular shoulder 34 at one end and a circumferential groove 36 adjacent their opposite ends. Between shoulder 34 and groove 36, the pads are provided with a conical surface 38 which tapers outwardly from shoulder 34 to groove 36. Pads 30 are held in assembled relation by a coil spring 40 and a flat retainer spring 42. Retainer spring 42 is formed of relatively light flat spring stock and is preferably of single thickness; that is, it extends around the assembly 12 as a single convolution, there being a slight gap 44 between the opposite ends thereof. The width of spring 42 corresponds to the width of slot 36 so that the spring has an accurate close fit in slot 36. Spring 42 normally tends to contract slightly around pads 30. However, the means for actually retaining the pads in their assembled relation is not spring 42 but coil spring 40. Coil spring 40 is of relatively heavy construction, and the length thereof in relation to the width of groove 36 is not critical. As a matter of fact, there is a clearance 46 between each end of spring 40 and the adjacent edge of grooves 36. Thus, ends of the wire forming spring 40 can be cut off square and need not be ground flat. Coil spring 40 contracts itself around spring 42 and tends to hold the pads 30 in abutting relation along their longitudinal edges. In the drawing, the pads 30 are shown having a slight clearance 48 at their adjacent longitudinal edges. The reason for this is that a length of bar stock 50 is shown inserted within the pad assembly 12, the diameter of the bar stock 50 corresponding to the radius about which the serrations 32 are formed and being such as to maintain the pads 30 in a slightly circumferentially spaced condition. With the bar stock 50 inserted within pad assembly 12, the dimensions of the taper formed on the surface 38 are such that the rounded annular nose 28 engages the conical surface 38 approximately midway between groove 36 and shoulder 34.

In operation, a length of bar stock 50 is arranged within the pusher by introducing it through the opening 52. The tapered mouth 54 at the rear end of pad assembly 12 enables the bar stock to be guided readily into the pad assembly, thus expanding spring 40. When the pusher actuator 16 is advanced in the feeding direction, that is, towards the left as shown in Fig. 1, the tapered annular nose 28 shifts axially of the conical surface 38 on the pad assembly until it contacts this surface, thus urging the pads 30 inwardly into firm gripping engagement with the bar 50. As soon as the annular tapered nose 28 engages the conical surface 38, the bar 50 is tightly gripped and the bar 50, the pad assembly 12 and the shell 10 feed to the left as a single unit. By forming the nose portion 28 with a rounded edge, the area of contact with the tapered surface 38 is very small. Thus, there is but little friction, a high unit pressure is developed and the gripping action is instantaneous. When the pusher actuator 16 is retracted, that is, shifted to the right, the annular tapered nose 28 releases from engagement with the conical surface 38 and abuts against shoulder 34 to slide the pad assembly 12 over the bar 50. Spring 40 is designed such that the pads 30 snugly engage the bar 50 when the nose 28 is out of engagement with the conical surface 38 but nevertheless slide rather readily over the bar 50 when the shoulder 22 of nose 28 engages with shoulder 34 on the retraction stroke. Thus, spring 40 yieldably resists axial movement of pad assembly 12 relative to bar 50, but not with sufficient tension to produce scoring of the bar 50 as the pad assembly is retracted over the bar.

Thus, with the present arrangement, the pad assembly 12 is readily slidable over the bar 50 when the pusher actuator 16 is retracted; but it quickly and positively grips the bar 50 when the power-driven actuator 16 is shifted in the feed direction; that is, shifted to the left. In the pad arrangement shown, the shell 10 need only move axially from the position where shoulders 22 and 34 are interengaged through the clearance distance 56 before the pads 30 are brought into firm clamping engagement with bar 50. Thus, the feed cycle can be performed in a very short period of time.

It will be observed that since pad assembly 12 projects axially outwardly of the leading end of shell 10, the bar 50 can be fed through the machine until the remaining end portion is relatively short in length. In order to remove the remaining portion of the bar 50 from within the pusher, shell 10 is provided with a radial opening 58 through which a pin may be inserted when actuator 16 is in the retracted position to engage against the inner end face 60 of the pad assembly and thus prevent the pads from gripping the bar stock 50 when it is withdrawn through the opening 52 at the rear end of the machine.

I have discovered that the combination of the two springs 40 and 42 renders the present arrangement much more desirable than if only one of these springs were employed. Spring 42, by reason of its close fit within groove 36, maintains the pads 30 in perfect alignment axially of the assembly. It is very important that these pads be held in perfect alignment because if the conical surfaces 38 of all the segments 30 are not properly aligned, one or more of these surfaces 38 would be engaged by the tapered nose 28 before another of these surfaces is engaged by the tapered nose 28; and thus, the length of bar stock fed would vary. Spring 40 need not be accurately machined or ground at its ends and is designed such as to have just sufficient tension to prevent the pad assembly 12 from sliding on the feed stroke as the tapered nose 28 rides up on the conical surface 38 of the pads. It also enables nose 28 to be retracted to a position free of tapered surface 38 without axial movement of pad assembly 12 on bar 50 until shoulder 22 on shell 10 engages shoulder 34 on pad assembly 12.

The slight tension of spring 40 and the weight of the bar to be fed represents the total force that must be overcome to insert a new bar in the pusher. Thus, since the tension of spring 40 is only sufficient to prevent sliding of the pad assembly on the bar when shell 10 is shifted in the feed direction, the pads 30 expand readily when a bar is introduced through the mouth 54, and the feeding force need be relatively small. Since this force is a relatively light one the shell is not subjected to severe abuse in use and can therefore be of light construction as shown, especially at the threaded portion 14.

In the arrangement described, assembly and disassembly is readily accomplished. To assemble the components, pads 30 are inserted in shell 10 and arranged as a cylinder. Spring 42 is first snapped into groove 36. Thereafter, spring 42 is circumferentially expanded to pass over the outer end of the assembled pads 30 and then permitted to contract within groove 36. The pusher is disassembled by reversing these operations. One reason why the ease with which the pusher can be assembled and disassembled is important is because shell 10 may be of standard construction and dimension and used with a plurality of pad assemblies 12 of different sizes to accommodate bars of different sizes and shapes. The external dimension of the different pad assemblies would all be the same and the internal dimensions would vary in accordance to the size of stock to be fed by the pusher.

I claim:

1. A bar stock pusher comprising an outer shell and a pad assembly shiftable axially within said shell, said pad assembly comprising a plurality of circumferentially arranged pads adapted to grip a bar of stock, said pad assembly and shell having shoulder portions arranged to abut when the shell is shifted axially in one direction relative to the pad assembly to pull the pad assembly over the bar stock, means interengaging the pad assembly and the shell and responsive to relative axial movement thereof for causing the pad assembly to grip the bar stock when the shell is moved axially in the other direction, said pads having an annular groove around the outer surface thereof and spring means within said groove for holding said pads axially aligned relative to each other and for normally contracting the pads inwardly.

2. A bar stock pusher as called for in claim 1 wherein said spring means comprises an annular spring formed of flat strip material having a close fit at each edge with the opposite edges of said groove and a coil spring surrounding said annular spring.

3. A bar stock pusher as called for in claim 2 wherein said pad assembly is disposed partially within said shell and partially without said shell, said abutments being formed on the adjacent ends of said pad assembly and shell.

4. The bar stock pusher as called for in claim 3 wherein said pad assembly is provided with an externally tapered portion between the shoulder thereon and said groove, said tapered portion increasing radially in dimension in a direction axially towards said groove and means at said adjacent end of said shell cooperating with said tapered portion for urging said pads radially inwardly against the bar stock therein when the pusher is shifted axially of the paid assembly in the direction of said groove.

5. A bar stock pusher comprising an outer cylindrical shell having a bore portion of generally uniform diameter, said bore portion extending to adjacent one end of said shell, said shell having at said end a radially inwardly extending annular shoulder, a pad assembly comprising a plurality of arcuate segments arranged in cylindrical fashion, said pad assembly having an external annular groove thereon and having a radially outwardly extending shoulder at one end thereof, said last mentioned shoulder having an outer diameter less than the diameter of said generally uniform bore portion but greater than the internal diameter of said first mentioned shoulder, said shoulder on the pad assembly being disposed within said bore portion inwardly of the shoulder on the shell, said pad assembly having an outer tapered surface extending between said groove and the shoulder on the pad assembly, said tapered surface increasing in diameter in the direction of said groove and being of less diameter than the internal diameter of the shoulder on the shell adjacent the shoulder on the pad assembly and of greater diameter adjacent the groove than the internal diameter of the shoulder on the shell whereby when said shell is moved axially in one direction relative to said pad assembly, the shoulder on the shell engages the tapered surface on the pad assembly to urge said segments radially inwardly into tight gripping engagement with a bar of stock extending axially through the pad assembly and when moved axially in the opposite direction, said shoulders interengage to shift said pad assembly axially along the bar of stock in the direction in which said shell is moved and spring means within said groove normally urging said segments radially inwardly and for retaining said segments in axially fixed position relative to each other.

6. A bar stock pusher as called for in claim 5 wherein said spring means comprises an annular spring formed of flat spring stock dimensioned to have a close fit with said groove so that the opposite edges of the spring engage the opposite edges of the groove and a second spring comprising a coil spring.

7. A bar stock pusher as called for in claim 6 wherein said groove is rectangular in cross section, the base of said groove forming a cylindrical surface concentric with the axis of said pad assembly and the side walls of said groove form annular shoulders disposed in planes normal to the axis of the pad assembly.

8. A bar stock pusher as called for in claim 7 wherein said annular spring formed of spring stock comprises a single convolution in coplanar engagement with the base of said groove and said coil spring extends circumferentially around said first mentioned spring.

9. A bar stock pusher as called for in claim 8 wherein the inclination of said tapered surface is such that the substantially greater portion of the pad assembly extends axially beyond said outer shell when the internal shoulder on the shell comes into engagement with said tapered surface.

10. A bar stock pusher as called for in claim 9 wherein said shoulder on the shell is tapered adjacent the axially outer end thereof, said tapered portion of the shoulder being arranged to engage with the tapered surface of the pad assembly.

11. A bar stock pusher as called for in claim 8 wherein said shoulder and groove are disposed at opposite ends of said assembly.

12. A bar stock pusher as called for in claim 11 wherein said shoulder on the pad assembly is internally tapered in a radially outward direction towards the adjacent end of the pad assembly.

References Cited in the file of this patent

UNITED STATES PATENTS

| | | |
|---|---|---|
| 2,111,308 | Baxendale | Mar. 15, 1938 |
| 2,697,634 | Smith | Dec. 21, 1954 |